(12) United States Patent
Feduzi et al.

(10) Patent No.: US 7,600,269 B2
(45) Date of Patent: *Oct. 13, 2009

(54) VAPOR PERMEABLE RETROREFLECTIVE GARMENT

(75) Inventors: Rino A. Feduzi, Ranco (IT); Robert L. Jensen, Jr., Oakdale, MN (US); Jeanine M. Shusta, Mahtomedi, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/839,782

(22) Filed: Aug. 16, 2007

(65) Prior Publication Data

US 2008/0168591 A1      Jul. 17, 2008

Related U.S. Application Data

(63) Continuation of application No. 11/598,616, filed on Nov. 13, 2006, now abandoned, which is a continuation of application No. 11/365,944, filed on Mar. 1, 2006, now abandoned, which is a continuation of application No. 11/183,027, filed on Jul. 15, 2005, now Pat. No. 7,107,622, which is a continuation of application No. 09/918,267, filed on Jul. 30, 2001, now Pat. No. 6,931,665.

(51) Int. Cl.
*A41D 3/04* (2006.01)
*B32B 15/00* (2006.01)
*A41D 13/01* (2006.01)

(52) U.S. Cl. .............. 2/87; 2/82; 2/93; 2/97; 2/904; 428/164; 428/344; 428/423.3

(58) Field of Classification Search .............. 2/81, 2/85, 87, 93, 102, 108, 246, 244; 40/1.5, 40/1.6; 264/1.7, 1.9; 359/516–519, 529, 359/530, 534–536, 540, 542; 362/84, 103, 362/108; 428/67, 913
See application file for complete search history.

(56) References Cited

U.S. PATENT DOCUMENTS 2,787,975 A    4/1957   Dunn (Continued)

FOREIGN PATENT DOCUMENTS

DE         26 00 520        7/1976

(Continued)

OTHER PUBLICATIONS

Safe Reflections, Inc., "Eclipse™ High Visibility Image Apparel—Stock", 1 page, received Dec. 29, 2005.

(Continued)

*Primary Examiner*—Bobby H Muromoto, Jr.
(74) *Attorney, Agent, or Firm*—Nicole J. Einerson

(57) ABSTRACT

A vapor permeable retroreflective material for use on protective garments. The material may be formed in a non-continuous pattern that provides a high-level of retroreflective brightness, yet also provides adequate permeability to prevent exposure to trapped thermal energy and heated moisture. The non-continuous retroreflective pattern may include retroreflective regions and non-retroreflective regions arranged such that thermal decay through the protective garment is not substantially decreased in the regions corresponding to the retroreflective material. Rather, vapor permeation and thermal decay through the garment may be substantially the same as if the retroreflective material was not present.

16 Claims, 6 Drawing Sheets

U.S. PATENT DOCUMENTS

| | | | |
|---|---|---|---|
| 3,849,804 | A | 11/1974 | Rakow |
| 4,103,060 | A | 7/1978 | Bingham et al. |
| 4,263,345 | A | 4/1981 | Bingham |
| RE30,892 | E | 3/1982 | Bingham et al. |
| 4,401,494 | A | 8/1983 | Pernicano et al. |
| 4,418,110 | A * | 11/1983 | May et al. .................. 428/143 |
| 4,817,210 | A | 4/1989 | Aldridge et al. |
| 4,950,525 | A * | 8/1990 | Bailey ........................ 428/164 |
| 5,070,436 | A | 12/1991 | Alexander et al. |
| 5,128,804 | A * | 7/1992 | Lightle et al. ............... 359/515 |
| 5,207,852 | A * | 5/1993 | Lightle et al. ............... 156/230 |
| 5,269,840 | A | 12/1993 | Morris et al. |
| 5,316,838 | A * | 5/1994 | Crandall et al. ............ 442/183 |
| 5,344,705 | A | 9/1994 | Olsen |
| 5,467,484 | A | 11/1995 | Drescher et al. |
| 5,588,156 | A | 12/1996 | Panton, Jr. |
| 5,599,585 | A | 2/1997 | Cohen |
| 5,656,355 | A | 8/1997 | Cohen |
| 5,664,256 | A * | 9/1997 | Blauer et al. .................... 2/69 |
| 5,674,605 | A | 10/1997 | Marecki |
| 5,695,853 | A | 12/1997 | Billingsley et al. |
| 5,702,846 | A | 12/1997 | Sato et al. |
| 5,830,529 | A * | 11/1998 | Ross ........................ 427/152 |
| 5,837,347 | A | 11/1998 | Marecki |
| 5,910,858 | A | 6/1999 | Frey et al. |
| 5,959,774 | A | 9/1999 | Benson et al. |
| 6,009,560 | A * | 1/2000 | McKenney et al. ............ 2/244 |
| 6,048,611 | A | 4/2000 | Lu et al. |
| 6,110,558 | A | 8/2000 | Billingsley et al. |
| 6,148,442 | A * | 11/2000 | Porter ............................ 2/69 |
| 6,153,128 | A | 11/2000 | Lightle et al. |
| 6,155,689 | A | 12/2000 | Smith |
| 6,336,221 | B1 * | 1/2002 | Blauer et al. .................... 2/87 |
| 6,416,856 | B1 | 7/2002 | Crandall |
| 6,490,734 | B2 * | 12/2002 | Blauer et al. .................... 2/87 |
| 6,531,212 | B2 * | 3/2003 | Owusu et al. ............... 428/323 |
| 6,548,164 | B1 * | 4/2003 | Bacon, Jr. .................. 428/343 |
| 6,859,941 | B2 * | 3/2005 | Koppes .......................... 2/81 |
| 6,931,665 | B2 * | 8/2005 | Feduzi et al. .................... 2/87 |
| 6,974,610 | B1 | 12/2005 | Koppes |
| 7,107,622 | B2 | 9/2006 | Feduzi et al. |
| 2003/0150043 | A1 | 8/2003 | Koppes |
| 2004/0197670 | A1 | 10/2004 | Takeyama |
| 2005/0249926 | A1 | 11/2005 | Feduzi et al. |

FOREIGN PATENT DOCUMENTS

| | | |
|---|---|---|
| EP | 0 560 380 | 9/1993 |
| EP | 0 560 384 | 9/1993 |
| JP | 52-17587 | 2/1977 |
| JP | B-4-038584 | 2/1992 |
| JP | 5-222682 | 8/1993 |
| JP | A-9-504238 | 4/1997 |
| JP | A-10-500230 | 1/1998 |
| JP | 11-50378 | 2/1999 |
| JP | A-2000-303011 | 10/2000 |
| WO | WO 95/07179 | 3/1995 |
| WO | WO 95/31739 | 11/1995 |
| WO | WO 99/03007 | 1/1999 |
| WO | WO 00/41879 | 7/2000 |
| WO | WO 00/61239 | 10/2000 |
| WO | WO 00/79315 | 12/2000 |
| WO | WO 01/42823 | 6/2001 |
| WO | WO 02/103108 | 12/2002 |

OTHER PUBLICATIONS

Safe Reflections, Inc., "Eclipse™ High Visibility Image Apparel", 1 page, received Dec. 29, 2005.

Safe Reflections, Inc., "Custom reflective trims", 1 page, received Dec. 29, 2005.

Letter from James T. Nikolai dated Dec. 28, 2005, 2 pages.

"Hi visibility wear EN471 compliant", Arco, [online; retrieved on May 9, 2006], 1 page, retrieved from the Internet: URL:http://www.arco.co.uk/static/hi-visibility_wear.htm.

"ANSI 107-1999 Standard?" Arco, [online, retrieved on May 9, 2006], 1 page, retrieved from the Internet: URL:http://www.cssport.com/ansi.htm.

"ANSI 107-1999 Specifications", Safe Reflections, [online; retrieved on May 9, 2006], 2 pages, retrieved from the Internet: URL:http://www.safereflections.com/ansi.html.

"High-visibility warning clothing for professional use—Test methods and requirements," European Standard, Ref. No. EN 471, pp. 1-28, Sep. 2003.

"American National Standard for High-Visibility Safety Apparel," ANSI/ISEA, 107-1999, 28 pages, 1999.

"American National Standard for High-Visibility Safety Apparel and Headwear," ANSI/ISEA, 107-2004, 42 pages, 2004.

J. Randall Lawson and William H. Twilley. "Development of an Apparatus for Measuring the Thermal Performance of Fire Fighters' Protective Clothing," U. S. Department of Commerce Technology Administration, 56 pages, Oct. 1999.

ASTM E808-01, "Standard Practice for Describing Retroreflection," ASTM International, West Conshohocken, PA, Approved Dec. 10, 2001, Published Feb. 2002, pp. 856-865.

* cited by examiner

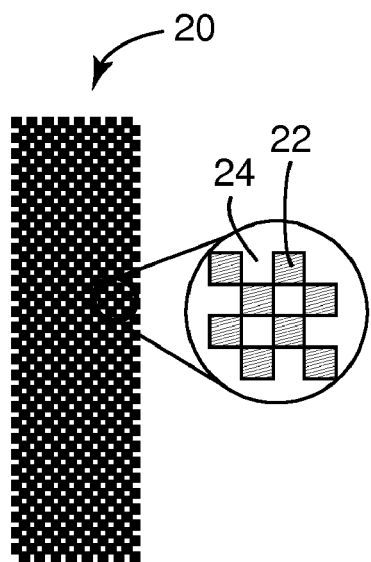
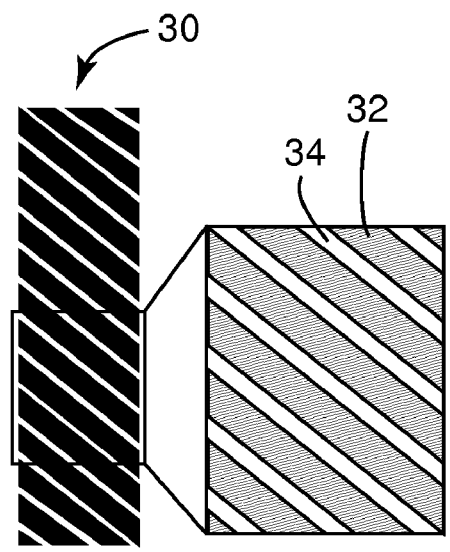
FIG. 2
FIG. 3
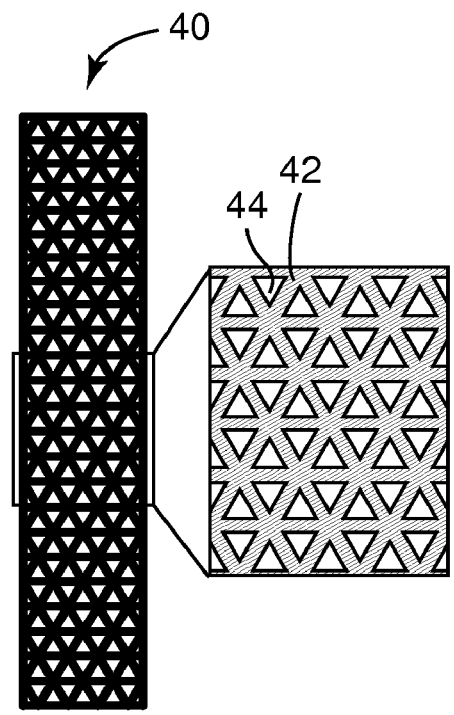
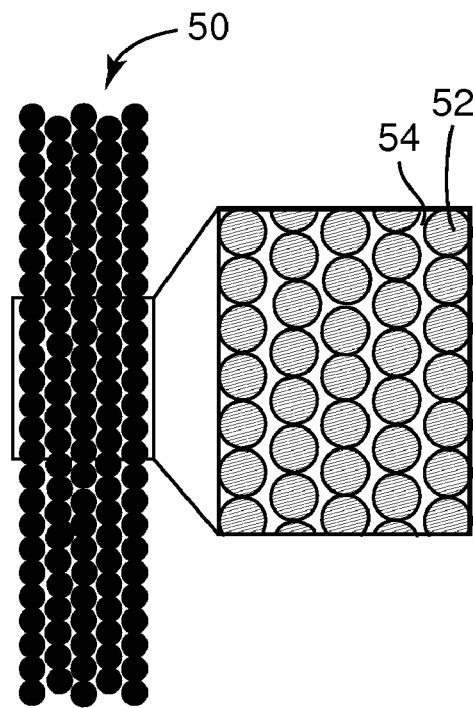
FIG. 4
FIG. 5

VAPOR PERMEABLE RETROREFLECTIVE GARMENT

CROSS-REFERENCE TO RELATED APPLICATIONS

This is a continuation of U.S. patent application Ser. No. 11/598,616, filed Nov. 13, 2006; now abandoned which is a continuation of U.S. patent application Ser. No. 11/365,944, filed Mar. 1, 2006, abandoned; which is a continuation of U.S. patent application Ser. No. 11/183,027, filed Jul. 15, 2005, issued as U.S. Pat. No. 7,107,622; which is a continuation of U.S. patent application Ser. No. 09/918,267, filed Jul. 30, 2001, issued as U.S. Pat. No. 6,931,665; the disclosures of which are herein incorporated by reference in their entirety.

FIELD

This disclosure relates to retroreflective material, and more particularly retroreflective material for use on protective garments.

BACKGROUND

Retroreflective materials have been developed for use in a variety of applications, including road signs, license plates, footwear, and clothing patches to name a few. Retroreflective materials are often used as high visibility trim materials in clothing to increase the visibility of the wearer. For example, retroreflective materials are often added to protective garments worn by firefighters, rescue personnel, EMS technicians, and the like.

Retroreflectivity can be provided in a variety of ways, including by use of a layer of tiny glass beads or microspheres that cooperate with a reflective agent, such as a coated layer of aluminum. The beads can be partially embedded in a binder layer that holds the beads to fabric such that the beads are partially exposed to the atmosphere. Incident light entering the exposed portion of a bead is focused by the bead onto the reflective agent, which is typically disposed at the back of the bead embedded in the binder layer. The reflective agent reflects the incident light back through the bead, causing the light to exit through the exposed portion of the bead in a direction opposite the incident direction.

Retroreflective materials can be particularly useful to increase the visibility of fire and rescue personnel during nighttime and twilight hours. In some situations, however, firefighter garments can be exposed to extreme temperatures during a fire, causing the retroreflective material to trap heat inside the garment. Under certain conditions, the trapped heat can result in discomfort or even burns to the skin of the firefighter.

In particular, moisture collected under the retroreflective material may expand rapidly when exposed to the extreme temperature from the fire. If the expanded moisture is unable to quickly permeate through the retroreflective material, the firefighter can be exposed to extreme temperatures. In some cases, this can result in steam burns on the skin of the firefighter underneath the portions of the garment having the retroreflective material. Conventional retroreflective materials, including perforated retroreflective materials generally exhibit this phenomenon. For example, conventional perforated retroreflective materials include standard retroreflective trim having needle punched holes, laser punched holes, slits, or relatively large holes made with a paper punch.

SUMMARY

In general, this disclosure describes vapor permeable retroreflective material for use on protective garments. For example, the material can be formed on the protective garment in a non-continuous pattern that provides a high-level of retroreflective brightness, yet also provides adequate permeability to prevent exposure to heated moisture and prolonged exposure to extreme temperatures.

In particular, the non-continuous pattern may include retroreflective regions and non-retroreflective regions. The regions are arranged such that the retroreflective regions do not substantially decrease thermal decay or vapor permeability. Rather, vapor permeability and thermal decay through the protective garment may be substantially the same as if the retroreflective pattern was not present.

In one aspect, a garment includes a protective outer layer such as an outer shell of a firefighter outfit, and a reflective material formed over a first portion of the protective outer layer. The retroreflective material can be formed in a non-continuous pattern to define retroreflective regions and non-retroreflective regions. Thermal decay through the first portion may be substantially equal to thermal decay through a second portion of the protective garment not covered by retroreflective material. Alternatively or additionally, vapor permeability through the first portion may be substantially equal to vapor permeability through a second portion of the protective garment not covered by retroreflective material. The garment may comprise an outer shell of a firefighter outfit and the first portion may comprise retroreflective trim on the outer shell of the firefighter outfit. In some aspects, the first portion formed with the non-continuous retroreflective pattern may have a reflective brightness greater than 50 candelas/(lux*meter$^2$) or even greater than 250 candelas/(lux*meter$^2$).

In another aspect, a protective outfit includes a first layer, a second layer and a third layer. The first layer may be an outer shell including a non-continuous retroreflective portion that has retroreflective regions and non-retroreflective regions and a second portion that does not have retroreflective regions. Moreover, vapor permeability and/or thermal decay through the non-continuous retroreflective portion may be substantially equal to vapor permeability through the second portion. The protective outfit may be a firefighter outfit in which the second layer is a moisture barrier and the third layer is a thermal liner. Alternatively, the protective outfit may be a thermal control outfit in which the second layer is a liquid retaining layer and the third layer is a waterproof vapor permeable layer. Again, the non-continuous retroreflective portion may have a reflective brightness greater than 50 candelas/(lux*meter$^2$) or even greater than 250 candelas/(lux*meter$^2$).

In other aspects, an article may include a first material, such as a durable cloth backing made of the same material as an outer shell of a firefighter outfit. In addition, the article may include retroreflective material formed on the first material according to a non-continuous pattern defining retroreflective regions and non-retroreflective regions. The retroreflective material can be arranged such that it does not substantially decrease thermal decay through the article. These retroreflective regions and vapor permeable non-retroreflective regions may form any of a variety of different configurations as described in greater detail below. The presence of the retroreflective regions may not substantially decrease thermal decay and or vapor permeability through the article. In one particular case, the article comprises a retroreflective patch for use on a garment. The material defining the non-continuous pattern may have a reflective brightness greater than 50 candelas/(lux*meter$^2$) or even greater than 250 candelas/(lux*meter$^2$).

In still other aspects, this disclosure describes one or more methods. For example, a method may include screen printing an adhesive pattern on a protective garment and pressing retroreflective beads on the adhesive pattern to create a retroreflective pattern. Vapor permeability and/or thermal decay through the protective garment in portions having the retroreflective pattern may be substantially the same as vapor permeability and/or thermal decay through the protective garment in portions of the garment that do not have the retroreflective pattern.

Alternatively, a method may include mixing retroreflective beads into an adhesive material and screen printing a pattern on a protective garment using the mixture. Again, vapor permeability and/or thermal decay through the protective garment in portions having the screened pattern may be substantially the same as vapor permeability and/or thermal decay through the protective garment in portions of the garment that do not have the screened pattern.

Non-continuous vapor permeable material can provide several advantages. In particular, unlike conventional retroreflective material, including perforated retroreflective material, the non-continuous vapor permeable material can provide improved thermal and vapor transfer through protective garments having retroreflective material thereon. Unlike conventional perforated retroreflective material that can decrease vapor permeability and thermal decay, this disclosure provides techniques for fixing retroreflective material to protective garments without substantially effecting the permeability of the garment, thereby reducing the risk of injury due to heated moisture and extreme temperatures. In addition, the techniques described herein can provide improved thermal decay through an outer shell versus the use of conventional retroreflective material, such as perforated retroreflective material, thereby allowing any heat trapped within the protective outfit to escape.

Other advantages of the non-continuous retroreflective material include the ability to use highly retroreflective material on a protective garment without risking potential injury to the wearer of the garment due to extreme temperatures. The use of retroreflective material is particularly important during nighttime and twilight hours when visibility is low. The disclosure below can provide for the creation of non-continuous retroreflective material having a reflective brightness greater than 50 candelas/(lux*meter$^2$) or even greater than 250 candelas/(lux*meter$^2$) without substantially changing the vapor permeability and thermal decay of the garment.

In addition, providing retroreflective material on protective outfits using screen printing techniques or other techniques described herein can improve the production of protective outfits. Moreover, the retroreflective patterns created as described below may be thinner and much less bulky that more conventional retroreflective material used on conventional protective garments.

Additional details of these and other embodiments are set forth in the accompanying drawings and the description below. Other features, objects and advantages will become apparent from the description and drawings, and from the claims.

BRIEF DESCRIPTION OF THE DRAWINGS

FIGS. 2-5 further illustrate exemplary non-continuous vapor permeable retroreflective patterns.

DETAILED DESCRIPTION

In general, this disclosure describes vapor permeable retroreflective material for use on protective garments. The material may include a non-continuous retroreflective pattern that provides a high-level of retroreflective brightness, yet provides adequate permeability to prevent exposure to heated moisture and extreme temperatures.

In some cases, this disclosure describes the garment itself, i.e., an outer layer or outer shell of a protective outfit. In other cases, this disclosure describes an article, such as a clothing patch that could be added to a protective garment. In still other cases, this disclosure describes a protective outfit that includes the non-continuous retroreflective pattern on an outer shell and additional layers such as a thermal liner and a moisture barrier.

The non-continuous retroreflective pattern may include retroreflective regions and non-retroreflective regions. However, unlike conventional retroreflective material, the presence of retroreflective regions do not substantially decrease thermal decay or vapor permeability through the material. In other words, the thermal decay and vapor permeability through the material are not substantially reduced by the retroreflective pattern. Rather, vapor permeability and thermal decay through the material may be substantially the same as if the retroreflective pattern was not present. In general, vapor permeability is a measure of the transfer rate of vapor through a material. Thermal decay is a measure of the rate at which heat can escape through a material.

Figure 1:
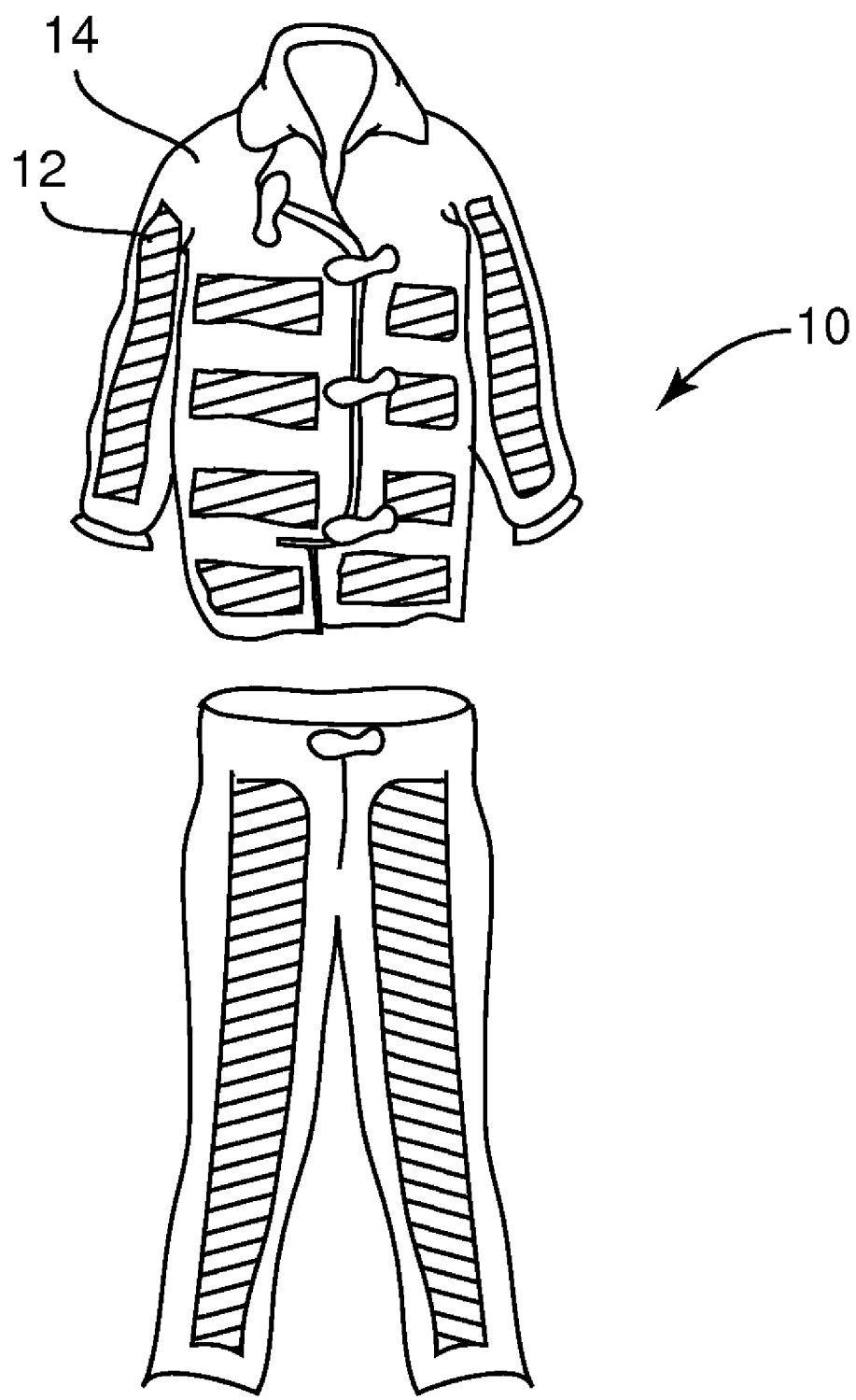
FIG. 1 illustrates a protective garment incorporating a non-continuous retroreflective material.

FIG. 1 illustrates a protective garment 10 such as an outer shell of a protective outfit worn by a firefighters Protective garment 10 includes an outer shell having retroreflective material formed in a non-continuous pattern over a first portion 12 to define retroreflective regions and non-retroreflective regions. A second portion 14 does not have retroreflective regions. As described in greater detail below, thermal decay through the first portion 12 is substantially equal to thermal decay through the second portion 14. In addition, vapor permeability through the first portion 12 is substantially equal to thermal decay through the second portion 14.

First portion 12 may include an article, such as a clothing patch formed with a non-continuous retroreflective pattern, or alternatively, non-continuous retroreflective pattern may be printed directly onto the surface of protective garment 10 as discussed below. Importantly, unlike conventional retroreflective materials used with protective garments, first portion 12 does not trap heat or vapor inside protective garment 10. Garment 10 may also include other non-retroreflective fluorescent material (not illustrated) to provide improved visibility of garment 10 during the day.

FIGS. 2-5 illustrate a number of exemplary non-continuous patterns of retroreflective material formed on first portion 12. In particular, retroreflective material may be applied in these and similar non-continuous patterns onto a patch or other material, which may be sewn or otherwise attached to protective garment 10. For example, the retroreflective material may be applied by screen printing or by heat transferring the material from a tape-like substance as described below. In some aspects, the retroreflective material may be applied directly onto protective garment 10 to realize first portion 12. Of course, the patterns illustrated in FIGS. 2-5 are only exemplary, and other patterns could be used.

FIG. 2 illustrates an example non-continuous pattern 20 defining retroreflective regions 22 and vapor permeable non-retroreflective regions 24. In this arrangement, the retroreflective regions 22 and the vapor permeable non-retroreflective regions 24 form a checkerboard-like configuration having a surface area of approximately fifty percent retroreflective material. In one particular case, the vapor permeable non-retroreflective regions 24 and the retroreflective regions 22 have sides measuring approximately 0.3175 centimeters. In that case, the retroreflective regions have surface areas substantially less than one square centimeter.

Conventional retroreflective materials can substantially reduce vapor permeability and thermal decay through garments. The use of non-continuous pattern 20 resolves this issue because the vapor permeable non-retroreflective regions 24 comprise a sufficient percentage of non-continuous pattern 20, allowing vapor and heat to escape. The presence of non-retroreflective regions 24, however, reduces the reflective brightness of the pattern. For example, if non-retroreflective regions 24 account for 50 percent of the surface area of non-continuous pattern, the reflective brightness would be approximately 50 percent less than it would be if retroreflective materials were applied in a continuous pattern.

The surface area of the non-retroreflective regions may need to comprise at least approximately 20% of a total surface area of the retroreflective material to ensure that vapor permeability and thermal decay through the garment are not increased. The examples of FIGS. 2-5 are all effective to allow vapor and heat to adequately escape. Non-retroreflective regions comprising greater than 20%, greater than 25%, and greater than 50% of the total surface area of the retroreflective material may be particularly effective.

Another factor that can affect vapor permeability and thermal decay may be the size of each individual retroreflective region and each individual non-retroreflective region. In particular, each retroreflective region may need to be sufficiently small to ensure that vapors and heat can escape through the material. Retroreflective regions having individual surface areas of less than four square centimeters and in some cases less than one square centimeter may be sufficient. This can help ensure that thermal decay and vapor permeability through portion 12 (FIG. 1) formed with the non-continuous retroreflective pattern 20 (FIG. 2) is substantially the same as thermal decay and vapor permeability through similar material, such as portion 14 that does not have any retroreflective regions 22.

FIG. 3 illustrates an example non-continuous pattern 30 defining retroreflective regions 32 and vapor permeable non-retroreflective regions 34. In this arrangement, the retroreflective regions 32 and the vapor permeable non-retroreflective regions 34 form a stripe like configuration. In other words, the non-retroreflective regions 34 comprise stripe-like regions that separate the retroreflective regions 32. The stripe-like configuration may have a surface area comprising approximately sixty-six percent retroreflective regions 32 and approximately thirty-three percent vapor permeable non-retroreflective regions 34. In one particular case, the non-retroreflective regions 34 are approximately 0.3175 centimeters wide and the retroreflective regions 32 are approximately 0.635 centimeters wide. Thermal decay and vapor permeability through portion 12 (FIG. 1) formed with the non-continuous retroreflective pattern 30 is substantially the same as thermal decay and vapor permeability through similar material, such as portion 14 that does not have any retroreflective regions.

FIG. 4 illustrates an example non-continuous pattern 40 defining retroreflective regions 42 and vapor permeable non-retroreflective regions 44. In this arrangement, the retroreflective regions 42 and the vapor permeable non-retroreflective regions 44 form a pattern with triangular shaped regions removed. In one case, the retroreflective regions 42 comprise approximately seventy-five percent of a surface area of the non-continuous pattern 40. In another case, the retroreflective regions 42 comprise approximately fifty percent of a surface area of the non-continuous pattern 40. Thermal decay and vapor permeability through portion 12 (FIG. 1) formed with the non-continuous retroreflective pattern 40 is substantially the same as thermal decay and vapor permeability through similar material, such as portion 14 that does not have any retroreflective regions. In still other aspects, both the retroreflective regions and the non-retroreflective regions comprise triangular shaped regions.

FIG. 5 illustrates an example non-continuous pattern 50 defining retroreflective regions 52 and vapor permeable non-retroreflective regions 54. In this arrangement, the retroreflective regions 52 comprise circular shaped regions within the non-retroreflective regions 54. Notably, thermal decay and vapor permeability through portion 12 (FIG. 1) formed with the non-continuous retroreflective pattern 50 is substantially the same as thermal decay and vapor permeability through similar material, such as portion 14 that does not have any retroreflective regions.

Figure 6:
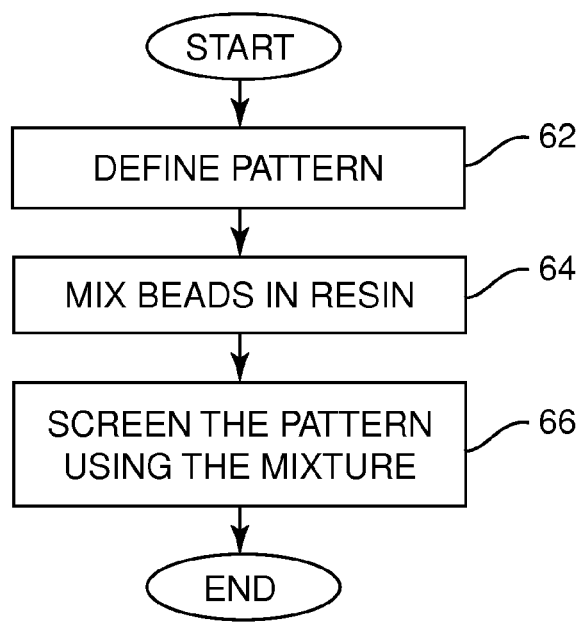
FIGS. 6 and 7 are flow diagrams illustrating processes for creating material having the non-continuous vapor permeable retroreflective patterns.

FIG. 6 is a flow diagram illustrating a screen printing process that can be used to form non-continuous vapor permeable retroreflective patterns like those illustrated in FIGS. 2-5. As discussed above, the pattern can be applied on a patch that can be sewn onto protective garment 10 (FIG. 1). Alternatively, the pattern can be applied directly on a portion of garment 10, thereby forming non-continuous retroreflective portion 12.

Vapor permeable retroreflective material can be formed by defining a non-continuous pattern (62), mixing retroreflective glass beads into a resin (64) and screen printing the mixture onto an article according to the defined pattern (66). The retroreflective beads may be half coated with aluminum. Suitable beads, for example, are #145 Reflective Glass Elements commercially available from Minnesota Mining and Manufacturing Company of St. Paul, Minn. After screen printing the mixture, the beads are oriented randomly within the resin. After screen printing the mixture, the mixture may be cured or dried according to a number of techniques. The reflective brightness that can be achieved by the process of FIG. 6 may be only approximately 25 candelas/(lux*meter$^2$) for total coverage because the beads are randomly oriented. Commonly assigned U.S. Pat. No. 5,269,840 provides additional details of one or more processes like that illustrated in FIG. 6, and is hereby incorporated herein by reference in its entirety.

Reflective brightness of retroreflective material is a measure of the apparent brightness of the article when viewed under standard retroreflective conditions, i.e., 0° orientation angle, −4° entrance angle, and 0.2° observation angle. The brightness is normalized for the area of the article and the illumination from the light source used. The reflectivity or reflective brightness is also referred to as the coefficient of retroreflection ($R_A$), and is expressed in units of candelas/(lux*meter$^2$). Reference is made to ASTM Standard Method #808-94, "Standard Practice For Describing Retroreflection."

As mentioned above, the reflective brightness of the vapor permeable retroreflective material is related to the percentage of the surface area comprising retroreflective regions. For example, if the pattern has a surface area defined by approximately fifty percent retroreflective regions and approximately fifty percent non-retroreflective regions, the reflective brightness may only be approximately 12.5 candelas/(lux*meter$^2$) if the technique of FIG. 6 is used. This may be bright enough for some applications, but not bright enough for others. For example, it can be desirable to maximize the reflective brightness of firefighting garments to better ensure that firefighters are seen by motorists during nighttime and twilight hours.

Figure 7:
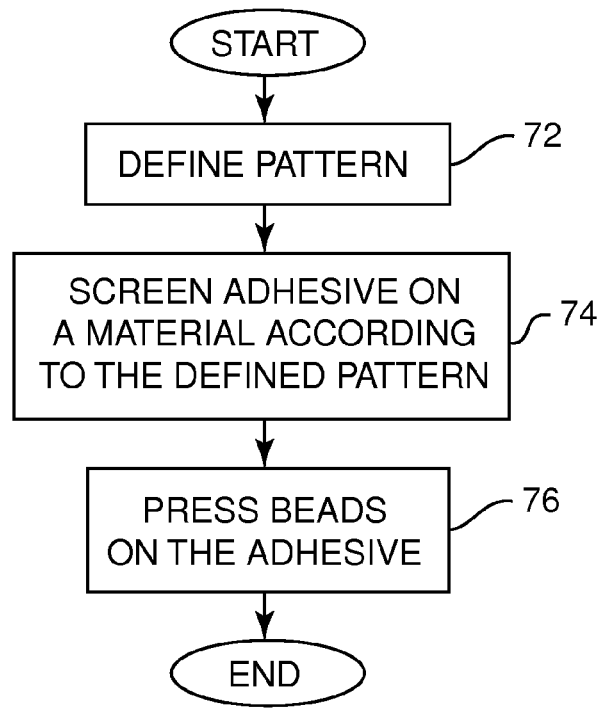

FIG. 7 illustrates a process that can be used to create non-continuous retroreflective patterns like that illustrated in FIGS. 2-5, wherein the reflective brightness is greater than 50 candelas/(lux*meter$^2$). In some cases, the brightness can be greater than 250 candelas/(lux*meter$^2$).

The process of FIG. 7 involves defining a pattern (72) and screen printing an adhesive on a material according to the defined pattern (74). For example, the material may comprise a portion of a protective garment or the material may comprise a patch for use with a protective garment. Retroreflective beads are then pressed on the adhesive pattern to create a retroreflective pattern (76).

Pressing the retroreflective beads on the adhesive pattern (76) can be performed in a number of ways. In one case, glass beads are first deposited onto a substrate and the exposed surfaces of the beads are coated with aluminum. The substrate is then pressed onto the screened adhesive, fixing the beads in the adhesive. The substrate can then be peeled back, leaving the half-aluminum coated beads properly oriented in the adhesive. Such a method can achieve reflective brightness of approximately 500 candelas/(lux*meter$^2$) for total coverage. Thus, if the pattern defines fifty percent coverage, the reflective brightness of the material may be approximately 250 candelas/(lux*meter$^2$). If the pattern defines sixty-six percent coverage, the reflective brightness of the material may be approximately 330 candelas/(lux*meter$^2$). If the pattern defines seventy-five percent coverage, the reflective brightness of the material may be approximately 375 candelas/(lux*meter$^2$).

EXAMPLE 1

5720 3M™ Scotchlite™ Silver Graphic Transfer Film commercially available from Minnesota Mining and Manufacturing Company of St. Paul, Minn. (hereafter 3M) was used to demonstrate non-continuous vapor permeable retroreflective material. Graphic images were made and transferred to Kombat™ fabric comprising PVI/Kevlar® blended fabric available from Southern Mills of Union City, Ga. The fabric with the graphic images was then tested. The graphic images were used as one example of a non-continuous retroreflective pattern. Specifically, the sample was prepared according to the following procedure.

The 5720 Silver Graphic Transfer Film (SFEE1134-3-2-1A with polyester carrier) was screen printed with SX 779B FR Printable Adhesive (fire retardant SX 864B plastisol ink) available from Plast-O-Meric SP, Inc., Sussex, Wis., modified with 3M™ 571N Coupler (A-1120 silane, 4% by weight). The ink was printed through a 110 T/in (43.3 T/cm) printing screen with a medium hardness squeegee onto the 5720 Graphic Transfer Film using a Cameo printer available from American M & M Screen Printing Equipment of Oshkosh, Wis. The artwork of the screen consisted of three stripes with different graphic patterns (checker board, hash-marks, and circles). The resulting prints were gelled by passing them through a Texair™ Model 30 conveyor oven available from American Screen Printing Equipment Co., Chicago, Ill., having a belt temperature of 230 degrees Fahrenheit (110 degrees Centigrade). The oven was heated by an IR panel set at 1100 degrees Fahrenheit (593 degrees Centigrade), and the belt temperature was controlled by belt speed. After gelation, the printed graphic images, were laminated to Kombat™ fabric using a HIX N-800 press available from HIX Corp. of Pittsburg, Kans., set at 340 degrees Fahrenheit (171 degrees Centigrade) for 30 seconds at an air line pressure of 40 psi (276 kPa). After the samples had cooled to room temperature, the polyester carrier was removed, yielding silver graphic images on the Kombat™ fabric. This Kombat™ fabric, containing silver images, was attached by sewing in the upper right-hand corner to the remaining two layers that make up the protective outfit shown in FIG. 8. This complete assembly was then tested according to a procedures that substantially conformed standard industry testing procedures.

Another way of pressing the retroreflective beads on the adhesive pattern comprises depositing fully aluminum-coated beads onto the adhesive and then etching the aluminum from the exposed surfaces of the beads. Such a process can be continuous, and the need to peel back and discard a substrate is avoided. Additional details of this process are provided in copending and commonly assigned published PCT Application number WO0142823(A1), the entire content of which is hereby incorporated by reference. The process can achieve a reflective brightness of approximately 350 candelas/(lux*meter$^2$) or greater for total coverage. Thus, if the pattern defines fifty percent coverage, the reflective brightness of the material may be approximately 175 candelas/(lux*meter$^2$). If the pattern defines sixty-six percent coverage, the reflective brightness of the material may be approximately 231 candelas/(lux*meter$^2$). If the pattern defines seventy-five percent coverage, the reflective brightness of the material may be approximately 263 candelas/(lux*meter$^2$).

As yet another alternative to the processes of FIG. 6 or 7, a non-continuous vapor permeable retroreflective material having patterns like those illustrated in FIGS. 2-5 can be created as follows. Glass beads are first deposited and bonded onto a substrate and the exposed surfaces of the beads are coated with aluminum. An adhesive is then applied on top of the glass beads, creating a retroreflective tape-like substance. The pattern can then be cut into the tape-like substance before pressing the tape-like substance onto a material such as a patch or the outer shell of a firefighter outfit. Heat and pressure can be applied and the substrate can then be peeled back leaving the pattern of half-aluminum coated beads properly oriented in the adhesive and attached to the underlying material to define the non-continuous vapor permeable retroreflective material.

EXAMPLE 2

8710 3M™ Scotchlite™ Silver Transfer Film commercially available from 3M was also used to realize non-continuous vapor permeable material. 8710 Silver Graphic Images were made and transferred to a Nomex® outer shell material available from Southern Mills of Union City, Ga. The Nomex® outer shell material was then tested. The graphic images were used as another example of a non-continuous vapor permeable retroreflective material.

Specifically, the 8710 Silver Graphic Images were prepared according to the following procedure. The 8710 Silver Transfer Film (75-0001-6745-4) graphic images were plotter cut, the weed was removed, and the material was then laminated to Nomex® outer shell material using a HIX N-800 press available from HIX Corp. of Pittsburg, Kans., set at 338 degrees Fahrenheit (170 Centigrade) for 15 seconds at an air line pressure of 40 psi (276 kPa). After the samples had cooled to room temperature, the paper carrier was removed, yielding silver graphic images on the Nomex® outer shell material. This material containing silver images was attached (by sewing in upper right-hand corner) to other layers that make up a protective outfit. This complete assembly was then tested according to a procedures that substantially conformed standard industry testing procedures.

Non-continuous vapor permeable retroreflective materials created as described above exhibit thermal decay properties and vapor permeability properties that have not been achieved in the prior art. In particular, the thermal decay and vapor permeability through non-continuous retroreflective material may be the same as the underlying material. In other words, the addition of the patterns of retroreflective material does not substantially alter either the vapor permeability of the material or the thermal decay through the material. For this reason, the non-continuous vapor permeable retroreflective material can improve the performance of protective firefighter garments.

Providing retroreflective material on protective garments using screen printing techniques or non-continuous retroreflective tape like substances that are heat applied can improve the production process associated with the creation of protective garments. Moreover, the non-continuous retroreflective patterns may be thinner and much less bulky that more conventional retroreflective material used on conventional protective garments. In addition, the resultant non-continuous vapor permeable retroreflective material can be non-perforated, thus avoiding any perforation steps in the production process.

Figure 8:
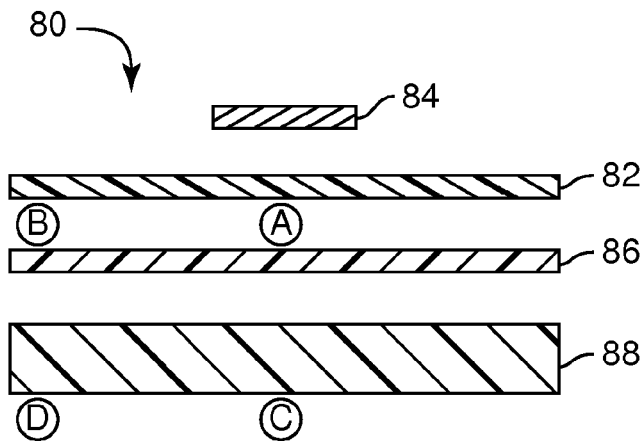
FIG. 8 is a cross-sectional view of a multi-layer firefighter outfit that includes an outer shell incorporating a non-continuous retroreflective material.

FIG. 8 is a cross-sectional view a multi-layer protective firefighter outfit. Firefighter outfit 80 includes an outer shell 82, having a retroreflective portion 84 thereon. Firefighter outfit 80 also includes moisture barrier 86 and thermal liner 88. Retroreflective portion 84 carries retroreflective material formed in a non-continuous pattern. Portion 84 may be a patch that is sewn or otherwise attached to outer shell 82. Alternatively, portion 84 may include a non-continuous retroreflective pattern screened directly on outer shell 82 as described above.

Outer shell 82 represents a typical outer shell used in firefighter protective outfits. For example, outer shell may protect the firefighter from scrapes or abrasions and may be coated with a water repellent or the like. An example is Kombat™ fabric comprising PVI/Kevlar® blended fabric available from Southern Mills of Union City, Ga.

Moisture barrier 86 can be used to keep liquid from penetrating into thermal liner 88. Older firefighter outfits used moisture barriers that were vapor impervious. However, newer designs have utilized moisture barriers that are vapor permeable to provide added comfort to the wearer. If moisture barrier 86 is vapor permeable, hot vapors may be able to penetrate to the skin of the wearer, causing discomfort or burns if the vapors cannot escape through the outer shell or through the outer shell equipped with retroreflective material. Indeed, the use of vapor permeable moisture barriers is one of the underlying reasons that called for the non-continuous vapor permeable retroreflective material. An example of a suitable vapor permeable moisture barrier is Crosstech™ material on Nomex® pajama check material available from W.L Gore of Elkton, Md.

Thermal liner 88 can be used to protect the wearer from extreme temperatures. An example of a suitable thermal liner is Aralite® material including 100% Kevlar® batt with 100% Nomax® face cloth, available from Southern Mills of Union City, Ga.

Figure 9:
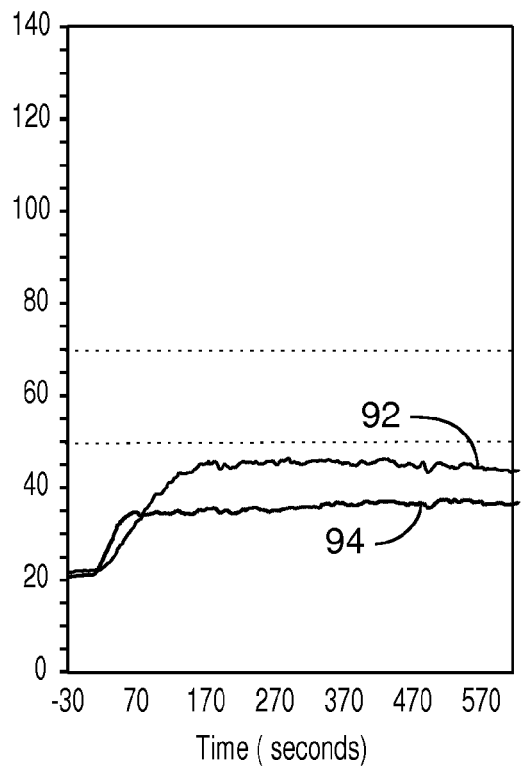
FIGS. 9 and 10 are graphs summarizing experimental data collected in testing the vapor permeability of a protective garment.
Figure 10:
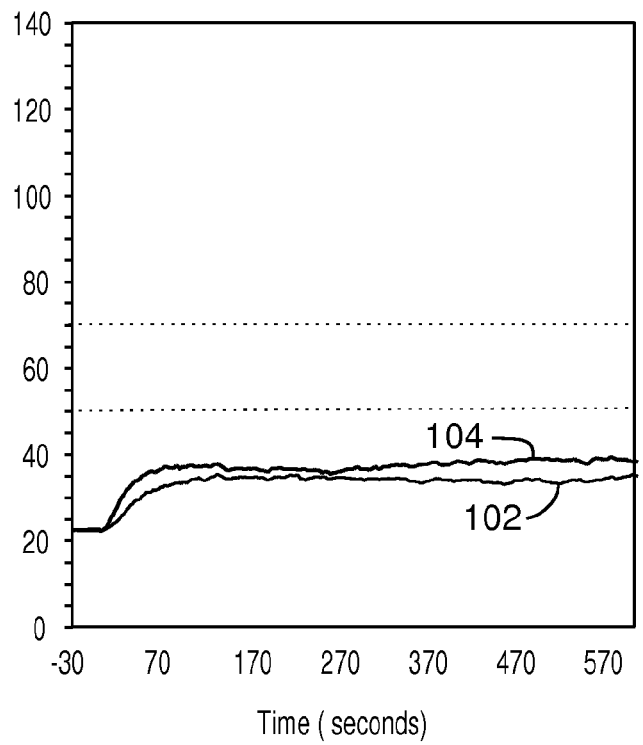

FIGS. 9 and 10 are graphs summarizing experimental data collected in testing the vapor permeability of prior art firefighter garments and firefighter garments making use of a retroreflective material formed in a non-continuous pattern. Reference is made to industry standard testing methods described in Lawson, J. Randall and Twilley, William H., "Development of an Apparatus for Measuring the Thermal Performance of Firefighters Protective Clothing", National Institute of Standards and Technology, Gaithersburg, Md., 1999 (NISTIR 6400); and American Society for Testing and Materials, E162 "Standard Test Method for Surface Flammability of Materials Using a Radiant Heat Energy Source", ASTM Annual Book of Standards, Volume 04.07, West Conshohocken, Pa., 1997. The various testing and experiments described below substantially conformed to the industry standard testing methods described in the above-mentioned references.

In particular, FIG. 9 illustrates the vapor permeability of a prior art construction that utilizes a retroreflective standard trim material rather than a non-continuous vapor permeable retroreflective material for portion 84 (FIG. 8). FIG. 10 illustrates the vapor permeability of a garment utilizing retroreflective material formed in a non-continuous pattern on portion 84. In both cases, the respective garment was subjected to heat, and temperatures at particular points within the respective garment were recorded over time.

Referring to FIG. 9, line 92 graphs temperature as a function of time measured at point C (FIG. 8) of a firefighter garment using a prior art retroreflective standard trim material rather than a non-continuous vapor permeable retroreflective material for portion 84. Similarly, line 94 illustrates temperature measured at point D of a prior art firefighter garment. Notably, after approximately 70 seconds, the temperature at point C becomes hotter than the temperature at point D. This is due, at least in part, to the fact that hot vapors were unable to adequately permeate through the prior art retroreflective material, and were driven down through the vapor permeable moisture barrier 86 and condensed, quickly raising the temperature at point C. In the experiments, the mass transfer of hot vapors was visually apparent as moisture condensed on the thermal liner 88 in the regions covered by the prior art retroreflective material. Notably, prior art retroreflective material having perforations showed similar results.

Unlike conventional retroreflective material, the use of non-continuous retroreflective material for portion 84 resulted in the desired vapor permeability. Referring to FIG. 10, line 102 graphs temperature as a function of time measured at point C (FIG. 8) of a firefighter garment having a non-continuous vapor permeable retroreflective material for portion 84. Line 104 graphs temperature as a function of time measured at point D of a firefighter garment including retroreflective material formed in a non-continuous pattern as described herein. As shown, the temperature at point C remains cooler than the temperature at point D at all times, due to the dissipation of the hot vapors developed from water retained under outer shell through portion 84. In other words, hot vapors were able to adequately permeate through non-continuous retroreflective material, i.e., portion 84.

Figure 11:
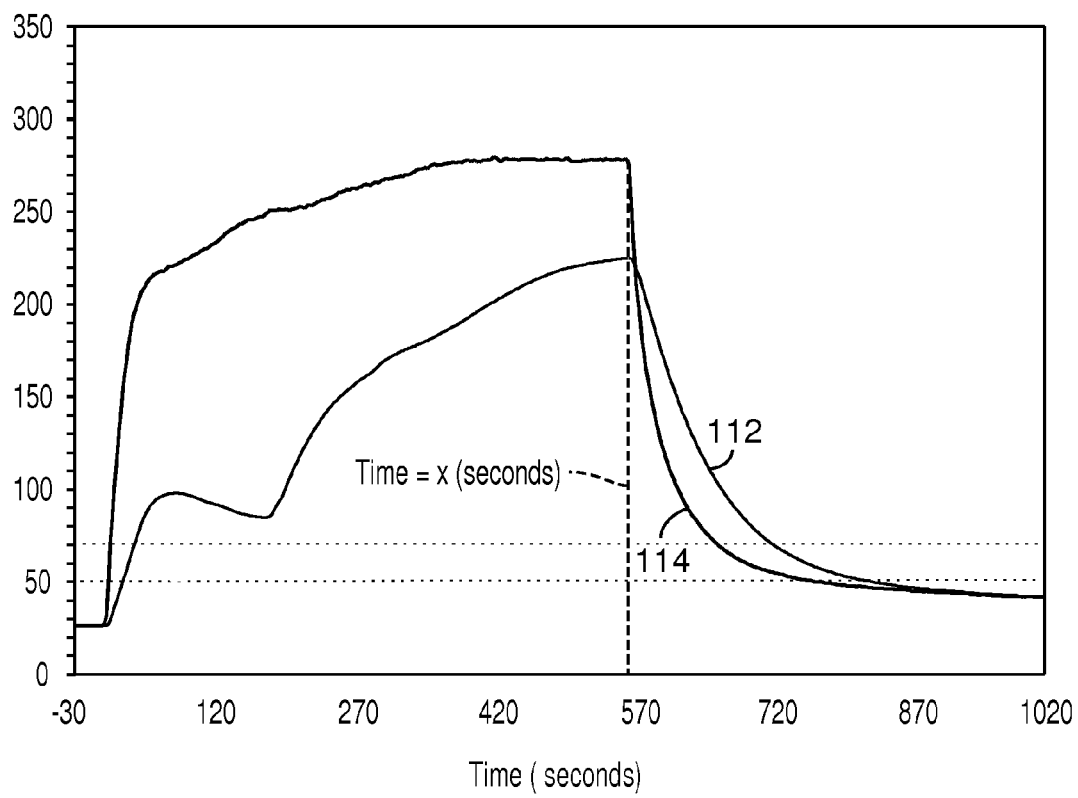
FIGS. 11 and 12 are graphs summarizing experimental data collected in testing the thermal decay of heat escaping a protective garment.
Figure 12:
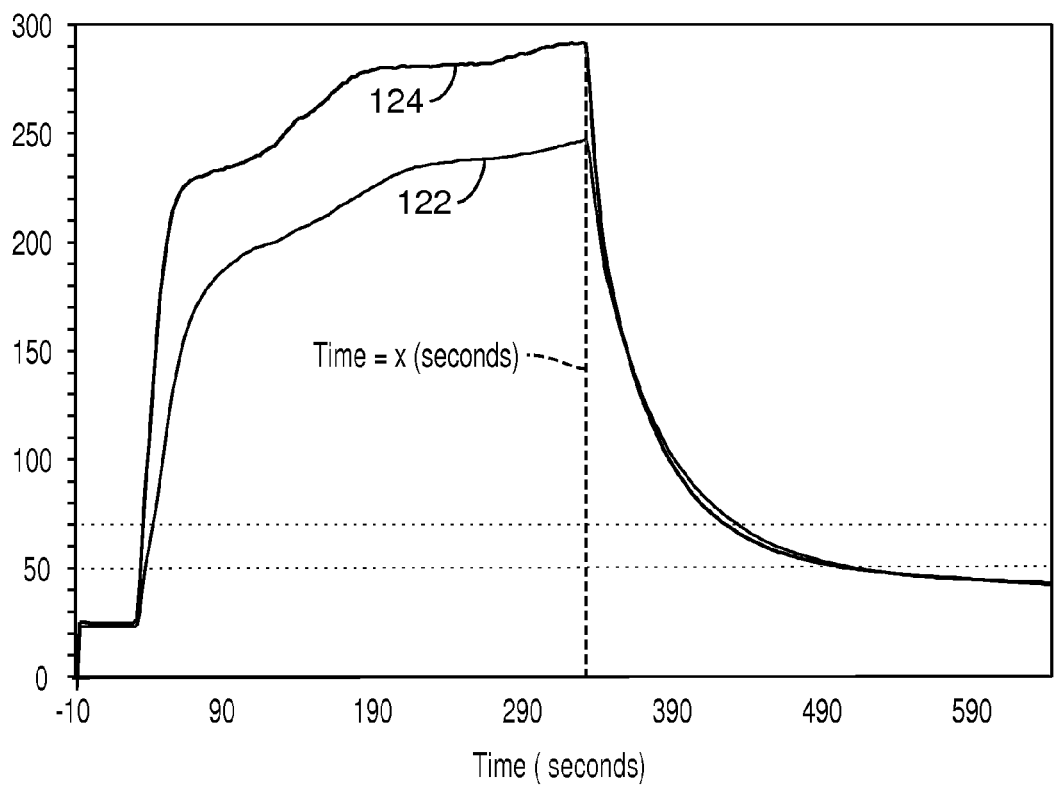

FIGS. 11 and 12 are graphs summarizing experimental data collected in testing the thermal decay of heat escaping a firefighter garment. Again, industry standard testing methods were used. FIG. 11 shows the thermal decay of a prior art construction that utilizes a retroreflective standard trim material rather than a non-continuous vapor permeable retroreflective material for portion 84. FIG. 12 illustrates the thermal decay of a garment utilizing a non-continuous vapor permeable retroreflective material for portion 84.

Referring to FIG. 11, line 112 graphs temperature as a function of time measured at point A (FIG. 8) of a prior art firefighter garment. Again, the prior art firefighter garment utilized retroreflective standard trim material rather than a non-continuous vapor permeable retroreflective material for portion 84. Line 114 graphs temperature as a function of time measured at point B of a prior art firefighter garment. In the experiment, the firefighter garment was exposed to extreme temperatures and then removed from proximity to the heat source and allowed to cool. In the graph, the point at time=X corresponds to the point in time when the garment was removed from the heat source.

As can be seen by comparing line 112 to line 114, the thermal decay of the temperature at point A is less than the thermal decay of the temperature at point B. In other words, in the prior art firefighter garment it took longer for point A to cool off than it did for point B to cool off. The reason is at least in part due to the fact that the prior art retroreflective standard trim material reduced the rate of thermal decay through the outer shell. Heat was trapped inside the garment longer in the regions that correspond to the prior art retroreflective standard trim material.

Referring now to FIG. 12, line 122 graphs temperature as a function of time measured at point A (FIG. 8) of firefighter garment having a non-continuous vapor permeable retroreflective material for portion 84. Line 124 graphs temperature as a function of time measured at point B of the firefighter garment including retroreflective material formed in a non-continuous pattern as described herein. As can be seen by comparing line 122 to line 124, the thermal decay of the temperature at point A is approximately the same as the thermal decay of the temperature at point B. In other words, non-continuous vapor permeable retroreflective material does not substantially decrease the thermal decay through the outer shell of the firefighter garment. Heat was not trapped inside the garment for longer periods of time in the regions that correspond to the non-continuous vapor permeable retroreflective material.

Figure 13:
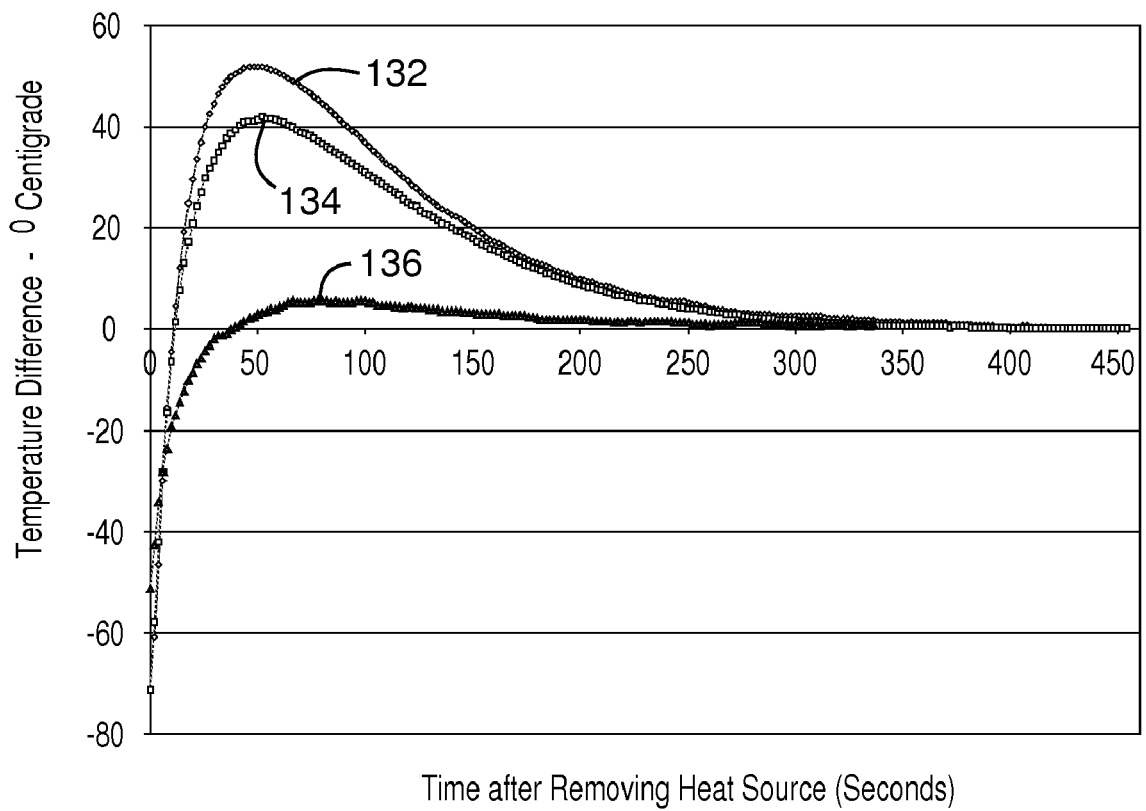
FIG. 13 is a graph of temperature differentials between various locations of various firefighter outfits showing thermal transfer characteristics of a garment incorporating non-continuous vapor permeable material in comparison to the prior art.

FIG. 13 is a graph of temperature differentials between points A and B (FIG. 8) for various different firefighter garments, i.e. a graph of the temperature at point A minus the temperature at point B over time. In FIG. 13, the point of approximately time=0 corresponds to the point in time at which the garment is removed from proximity to a heat source and allowed to cool. Line 132 corresponds to a prior art firefighter garment incorporating standard continuous non-perforated retroreflective trim. As can be seen by line 132, the temperature differential between the temperature under the outer shell versus the temperature under the outer shell with the standard retroreflective trim is relatively large. For example, after approximately 50 seconds, it was approximately 50 degrees Centigrade hotter behind the standard trim. Again, this is due to the fact that heat cannot adequately escape through the standard retroreflective trim.

Line 134 corresponds to a prior art firefighter garment incorporating standard continuous perforated retroreflective trim. As can be seen by line 134, the temperature differential between the temperature under the outer shell versus the temperature under the outer shell with the standard continuous perforated retroreflective trim is still relatively large. In other words, perforations do not resolve the thermal decay issue. For example, after approximately 50 seconds, it was approximately 42 degrees Centigrade hotter behind the standard continuous perforated retroreflective trim. Again, this is due to the fact that heat cannot adequately escape through the standard continuous perforated retroreflective trim.

Line 136 corresponds to a firefighter garment, incorporating a non-continuous vapor permeable retroreflective material for portion 84 (FIG. 8). As can be seen by line 136, the temperature differential between the temperature under the outer shell both with and without the non-continuous retroreflective material is much smaller than that of lines 132 or 134. In other words, non-continuous vapor permeable retroreflective material resolved the thermal decay issue. For example, after approximately 50 seconds, it was only approximately 4 degrees Centigrade hotter behind the non-continuous vapor permeable retroreflective material compared to the underlying material not having retroreflective material formed thereon. Moreover, after 50 seconds, it was never more than 8 degrees Centigrade hotter behind the non-continuous vapor permeable retroreflective material. This is due to the fact that heat can adequately escape through the non-continuous vapor permeable retroreflective material.

The graphs of FIGS. 9-13 illustrate the advantages of retroreflective material formed in a non-continuous pattern, in relation to the prior art. The retroreflective material formed in a non-continuous pattern as described herein provides improved thermal transfer and/or vapor transfer through protective garments having retroreflective material thereon. Conventional retroreflective material, such as retroreflective trim materials and perforated retroreflective trim materials provide inadequate thermal decay and vapor permeability characteristics. Non-continuous vapor permeable retroreflective material, however, exhibits substantially the same thermal decay characteristics and vapor permeability characteristics as the underlying material without the retroreflective material.

Firefighter garments, and thus multi-layer firefighter outfits, can be greatly improved by implementing non-continuous vapor permeable retroreflective material. If vapor cannot escape thought the outer shell because conventional retroreflective material provides a vapor barrier, hot vapors can be directed inward, toward the skin of the wearer, possibly causing steam burns or other discomfort to the wearer. The techniques described herein resolve this issue by providing a retroreflective material formed in a non-continuous pattern to define retroreflective regions and non-retroreflective regions. In this manner, the addition of retroreflective material does not substantially decrease vapor permeability of the outer shell.

Thermal decay through an outer shell having conventional retroreflective trim material, such as perforated retroreflective trim material, is substantially less than thermal decay through the outer shell in regions not having the conventional retroreflective trim material. Thus, heat trapped within the protective garment may not be able to escape fast enough for the firefighter to cool off at a desired rate. Rather, the presence of conventional retroreflective material such as perforated retroreflective trim material can cause heat to remain trapped inside the protective garment for longer periods of time, providing discomfort to the firefighter even after he or she has left the fire. The techniques described herein resolve this issue by providing a non-continuous vapor permeable retroreflective material that does not substantially decrease thermal decay of the garment in the portions having the non-continuous vapor permeable retroreflective material. In this manner, the vapor permeable retroreflective material can reduce the heat load within the various layers that comprise the firefighter outfit, reduce negative physiological impacts on the wearer, and reduce the likelihood of producing burn injuries on the wearer.

The techniques described herein can provide non-continuous vapor permeable retroreflective material having a reflective brightness greater than 50 candelas/(lux*meter$^2$) or even greater than 250 candelas/(lux*meter$^2$). Brightnesses in these ranges significantly increase visibility of a wearer during nighttime and twilight hours. Indeed, this can better ensure that firefighters are not only seen by night motorists, but more importantly, these brightness ranges can be achieved while still providing the vapor permeability and thermal decay characteristics described above.

Figure 14:
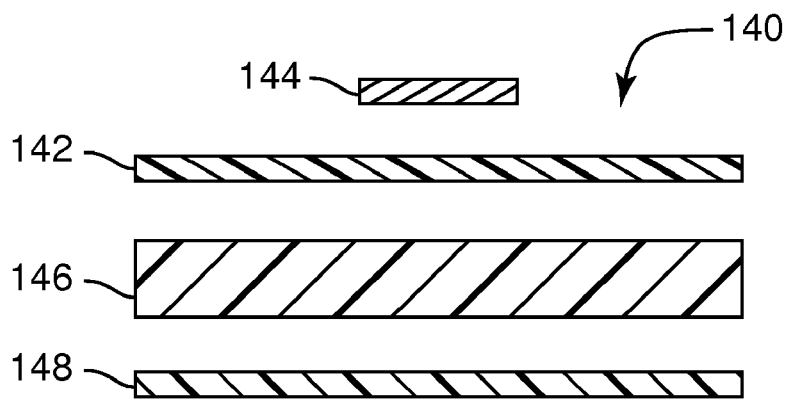
FIG. 14 is a cross-sectional view of another protective outfit incorporating a non-continuous retroreflective material on an outer shell.

FIG. 14 is a cross-sectional view of another protective multi-layer outfit that could benefit by the teaching of this disclosure. Protective outfit 140 is a protective multi layer thermal control outfit. Protective outfit 140 includes an outer shell 142, and a non-continuous vapor permeable retroreflective material defines portion 144 of outer shell 142. For example, portion 144 may be a patch that is sewn or otherwise attached to outer shell 142, or alternatively, portion 144 may be a portion of outer shell 142 having a non-continuous retroreflective pattern applied thereon as described above. Protective outfit 140 also includes liquid retaining layer 146 and waterproof vapor permeable layer 148.

Protective outfit 140 may be used to keep the wearer cool through the effects of evaporative cooling and by acting as a heat sink. The liquid retaining layer 146 can be soaked with water and water vapors can permeate through the outer shell 142 to cool the skin of the wearer. The outfit makes use of non-continuous vapor permeable retroreflective material to define portion 144 of outer shell 142. In this manner, the thermal transfer characteristics and vapor permeability characteristics of protective outfit 140 can be maintained while adding the effects of nighttime visibility through the use of retroreflective materials.

A number of implementations and embodiments have been described. For instance, non-continuous vapor permeable retroreflective material having retroreflective regions and non-retroreflective regions has been described. Thermal decay and vapor permeability through the non-continuous vapor permeable retroreflective material is substantially the same as thermal decay and vapor permeability through the underlying material that does not include non-continuous vapor permeable retroreflective material.

Nevertheless, it is understood that various modifications can be made without departing from the spirit and scope of this disclosure. For example, the non-continuous vapor permeable retroreflective material could be included in as part of any garment to provide retroreflectively in the garment and yet also provide adequate thermal decay and vapor permeability through the garment. In addition, the non-continuous vapor permeable retroreflective material could substantially or completely cover a garment or article. Also, the retroreflective material may be made florescent to enhance daytime visibility. In addition, alternative methods may be used to realize non-continuous vapor permeable retroreflective material. For example, various different graphic screen printing techniques, electronic digital printing techniques, plotter cutting, laser cutting, or die cutting of retroreflective substrates to be applied on a material, or other similar techniques may be used to realize non-continuous vapor permeable retroreflective material. Accordingly, other implementations and embodiments are within the scope of the following claims.

The invention claimed is:

1. A garment comprising a protective outer layer having a first portion and a second portion, wherein the first portion comprises a patch attached to the protective outer layer, wherein the patch is formed with a non-continuous retroreflective pattern of retroreflective material defining retroreflective regions and non-retroreflective regions, and further wherein the vapor permeability through the first portion of the protective outer layer is substantially equal to the vapor permeability through the second portion.

2. The garment of claim 1, wherein a surface area of the non-retroreflective regions comprises at least 20% of a total surface area of the patch.

3. The garment of claim 2, wherein a surface area of the non-retroreflective regions comprises at least 50% of a total surface area of the patch.

4. The garment of claim 1, wherein a surface area of each retroreflective region is less than four square centimeters.

5. The garment of claim 1, wherein the patch has a reflective brightness greater than 50 candelas/(lux*meter$^2$).

6. The garment of claim 1, wherein the garment comprises an outer shell of a firefighter outfit.

7. The garment of claim 1, wherein the non-continuous retroreflective pattern forms a checkerboard like configuration.

8. The garment of claim 7, wherein the checkerboard-like configuration includes approximately 50% retroreflective regions and approximately 50 non retroreflective regions.

9. The garment of claim 1, wherein the non-continuous retroreflective pattern forms a stripe-like configuration, wherein the non-retroreflective regions comprise stripe-like regions that separate the retroreflective regions.

10. The garment of claim 9, wherein the retroreflective regions comprise approximately 66% of a surface area of the patch.

11. The garment of claim 1, wherein the retroreflective material is also florescent.

12. An article comprising:
a first material; and
retroreflective material formed on the first material according to a non-continuous stripe-like configuration defining retroreflective regions and non-retroreflective regions, wherein the non-retroreflective regions comprise stripe-like regions that separate the retroreflective regions, wherein the retroreflective material also includes fluorescent material, and further wherein the retroreflective material is arranged such that it does not substantially decrease vapor permeability through the article.

13. The article of claim 12, wherein the retroreflective regions comprise approximately 66% of a surface area of the retroreflective material.

14. The article of claim 12, wherein the article comprises a retroreflective patch for use on a garment.

15. A garment comprising:

a protective outer layer; and retroreflective material formed over a portion of the protective outer layer in a non-continuous stripe-like configuration to define retroreflective regions and non retroreflective regions, wherein the non-retroreflective regions comprise stripe-like regions that separate the retroreflective regions, wherein the retroreflective material is also fluorescent, and further wherein the retroreflective material is arranged such that vapor permeability through the portion formed with retroreflective material is substantially equal to vapor permeability through the protective outer layer without retroreflective material.

16. The garment of claim 15, wherein the retroreflective regions comprise approximately 66% of a surface area of the retroreflective material.

* * * * *

UNITED STATES PATENT AND TRADEMARK OFFICE
CERTIFICATE OF CORRECTION

PATENT NO.        : 7,600,269 B2
APPLICATION NO.   : 11/839782
DATED             : October 13, 2009
INVENTOR(S)       : Rino A. Feduzi Page 1 of 1

It is certified that error appears in the above-identified patent and that said Letters Patent is hereby corrected as shown below:

Column 4
Line 54, Delete "firefighters" and insert -- firefighter. --, therefor.

Column 14
Line 41, In Claim 8, delete "50" and insert -- 50% --, therefor.

Signed and Sealed this

Twenty-fourth Day of November, 2009

David J. Kappos
*Director of the United States Patent and Trademark Office*